United States Patent
Heinzelman

(10) Patent No.: US 11,292,532 B1
(45) Date of Patent: Apr. 5, 2022

(54) EXTENDIBLE TRUCK BED STORAGE ASSEMBLY

(71) Applicant: David Heinzelman, Greenfield, IN (US)

(72) Inventor: David Heinzelman, Greenfield, IN (US)

( * ) Notice: Subject to any disclaimer, the term of this patent is extended or adjusted under 35 U.S.C. 154(b) by 32 days.

(21) Appl. No.: 17/087,751

(22) Filed: Nov. 3, 2020

(51) Int. Cl.
*B62D 33/02* (2006.01)
*B60R 9/06* (2006.01)

(52) U.S. Cl.
CPC ............ *B62D 33/0207* (2013.01); *B60R 9/06* (2013.01)

(58) Field of Classification Search
CPC .............................. B62D 33/0207; B60R 9/06
USPC ................ 224/404; 296/26.09, 37.6
See application file for complete search history.

(56) References Cited

U.S. PATENT DOCUMENTS

| | | | | |
|---|---|---|---|---|
| 4,573,731 A * | 3/1986 | Knaack | .................... | B60R 11/06 224/404 |
| 4,733,898 A * | 3/1988 | Williams | ................ | B62D 33/02 224/404 |
| 4,789,195 A * | 12/1988 | Fletcher | ................... | B60R 11/06 224/404 |
| 4,917,430 A * | 4/1990 | Lawrence | .................. | B60R 7/04 224/281 |
| D370,200 S * | 5/1996 | Garoutte | ...................... | D12/423 |
| 5,934,725 A | 8/1999 | Bowers | | |
| 5,938,262 A | 8/1999 | Mills | | |
| 5,979,725 A * | 11/1999 | Lehrman | .................... | B60R 7/02 220/23.87 |
| 5,996,868 A * | 12/1999 | Paradis | ...................... | B60R 9/00 224/404 |
| 6,065,792 A | 5/2000 | Sciullo | | |
| D426,187 S * | 6/2000 | Shultz | ........................ | D12/414.1 |
| 6,318,781 B1 * | 11/2001 | McKee | ...................... | B60R 9/00 296/26.09 |
| 6,328,364 B1 * | 12/2001 | Darbishire | .............. | B60P 1/003 296/26.09 |
| 6,659,524 B1 * | 12/2003 | Carlson | ................... | B60P 1/003 296/26.09 |
| 6,695,375 B1 * | 2/2004 | May | .......................... | B60R 9/00 224/281 |
| 6,705,656 B2 | 3/2004 | Keller | | |
| 6,811,068 B2 * | 11/2004 | Johnson | ................. | A63B 55/61 224/404 |
| 6,860,536 B1 | 3/2005 | Schimunck | | |
| 6,866,316 B1 * | 3/2005 | Harder | ..................... | B60R 11/00 248/300 |

(Continued)

*Primary Examiner* — Nathan J Newhouse
*Assistant Examiner* — Lester L Vanterpool

(57) ABSTRACT

An extendible truck bed storage assembly for accessing contents of a truck bed from a rear thereof includes a box, which is sized so that the box is removably insertable into the bed with opposed sides of the box being positioned proximate to the tire wells. The box has a top and a front, which are open. A ridge is engaged to a bottom of the box and positioned therein adjacent to the front. A tray is positioned in the box and is selectively extendible from the box through the front. A set of slats is engaged to a lower face of the tray with each slat being perpendicular to opposed edges of the tray. A user can lift and pull on the forward end of the tray to selectively extend is to access articles positioned thereon. The slats engage the ridge to prevent the tray from sliding until lifted.

15 Claims, 4 Drawing Sheets

(56) References Cited

U.S. PATENT DOCUMENTS

| | | | | |
|---|---|---|---|---|
| 6,923,354 | B2* | 8/2005 | Axelson | B60R 9/00 |
| | | | | 224/281 |
| 7,083,219 | B1* | 8/2006 | Gregory | B60P 1/003 |
| | | | | 296/100.12 |
| 7,543,872 | B1* | 6/2009 | Burns | B60P 1/003 |
| | | | | 296/26.08 |
| 7,543,873 | B1* | 6/2009 | Thornsberry | B60P 1/003 |
| | | | | 224/403 |
| 9,227,547 | B2* | 1/2016 | Williams | B60P 1/433 |
| 9,380,915 | B2* | 7/2016 | Sabounjian | A47B 88/90 |
| 11,124,247 | B2* | 9/2021 | Sosnowich | B60R 9/06 |
| 2004/0118887 | A1* | 6/2004 | Axelson | B60R 9/00 |
| | | | | 224/404 |
| 2006/0097021 | A1* | 5/2006 | Stanton | B60R 5/04 |
| | | | | 224/510 |
| 2007/0158968 | A1* | 7/2007 | Chandler | B60P 3/14 |
| | | | | 296/37.6 |
| 2007/0210599 | A1* | 9/2007 | Arnold | B60P 1/003 |
| | | | | 296/26.09 |
| 2016/0107560 | A1* | 4/2016 | Thygesen | B60R 5/04 |
| | | | | 296/37.6 |
| 2019/0315285 | A1* | 10/2019 | Steinhauser | B60R 9/06 |

* cited by examiner

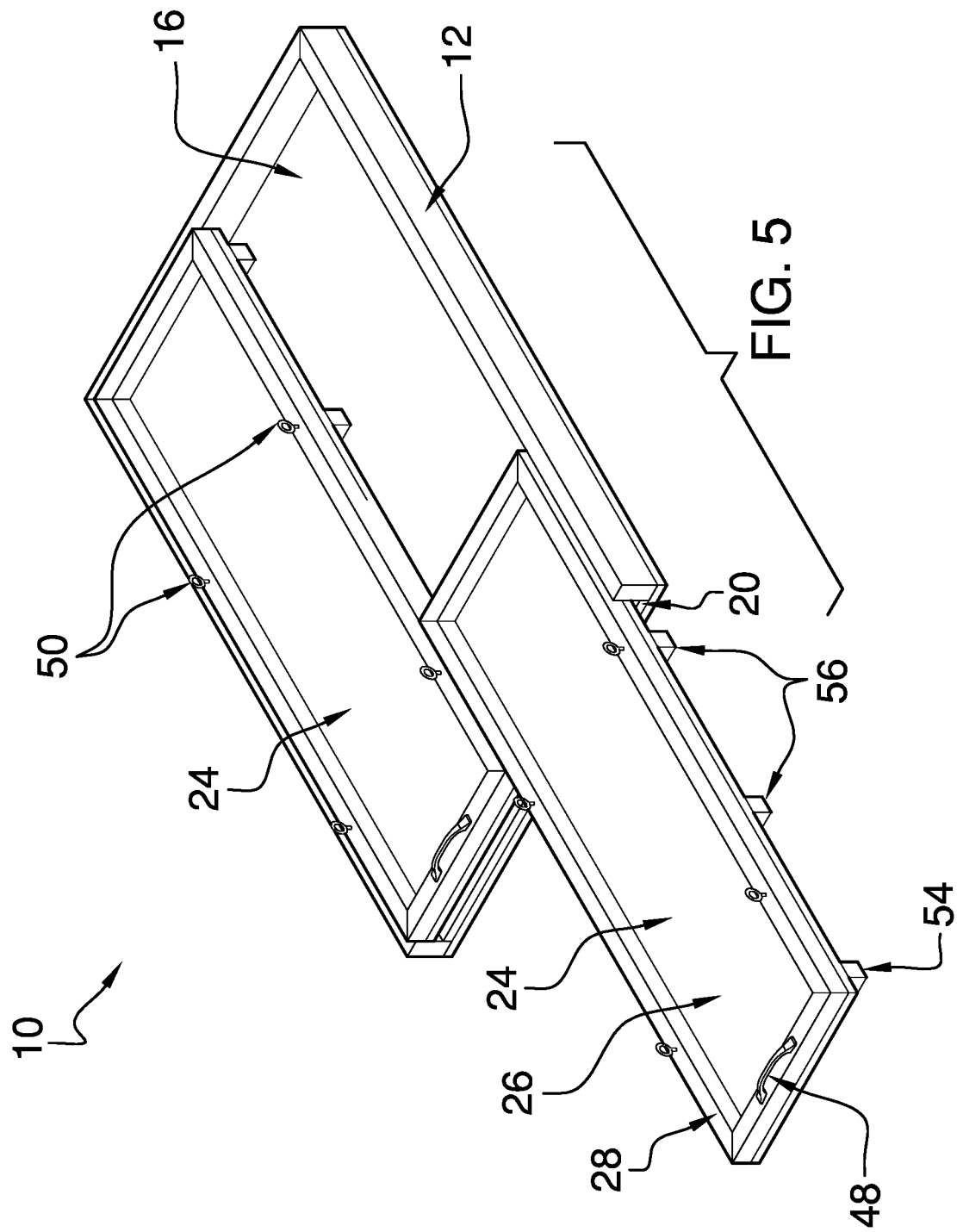

EXTENDIBLE TRUCK BED STORAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to storage assemblies and more particularly pertains to a new storage assembly for accessing contents of a truck bed from a rear thereof.

(2) DESCRIPTION OF RELATED ART INCLUDING INFORMATION DISCLOSED UNDER 37 CFR 1.97 AND 1.98

The prior art relates to storage assemblies for use in a bed of a pickup truck. Prior art storage assemblies generally comprise assemblies that comprise a fixed frame permanently mounted to the bed of the truck. These prior art assemblies may be intended for stowing a recreational vehicle. The prior art assemblies may comprise open-walled trays, slidable frames, or plates having wheels or rollers engaged thereto, with the wheels being operationally engaged to the fixed frame.

BRIEF SUMMARY OF THE INVENTION

An embodiment of the disclosure meets the needs presented above by generally comprising a box, which is sized so that the box is removably insertable into a bed of a truck with each of opposed sides of the box being positioned proximate to respective tire well of the truck. The box has a top and a front, which are open. A ridge is engaged to a bottom of the box and positioned therein adjacent to the front. A tray is positioned in the box and is slidably engaged thereto so that the tray is selectively extendible from the box through the front. The tray is configured to have articles positioned thereupon.

A set of slats is engaged to a lower face of the tray and extends between the forward end and a rearward end thereof. Each slat is perpendicular to opposed edges of the tray. The forward end of the tray is configured to be grasped in a hand of a user, positioning the user to lift and pull the tray to selectively extend the tray from the box to access the articles. Each slat is positioned to selectively engage the ridge as the tray is slid from the box, such that the tray is prevented from sliding until the tray is lifted to elevate the slat over the ridge.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is an isometric perspective view of an embodiment of the disclosure.

DETAILED DESCRIPTION OF THE INVENTION

Figure 1:
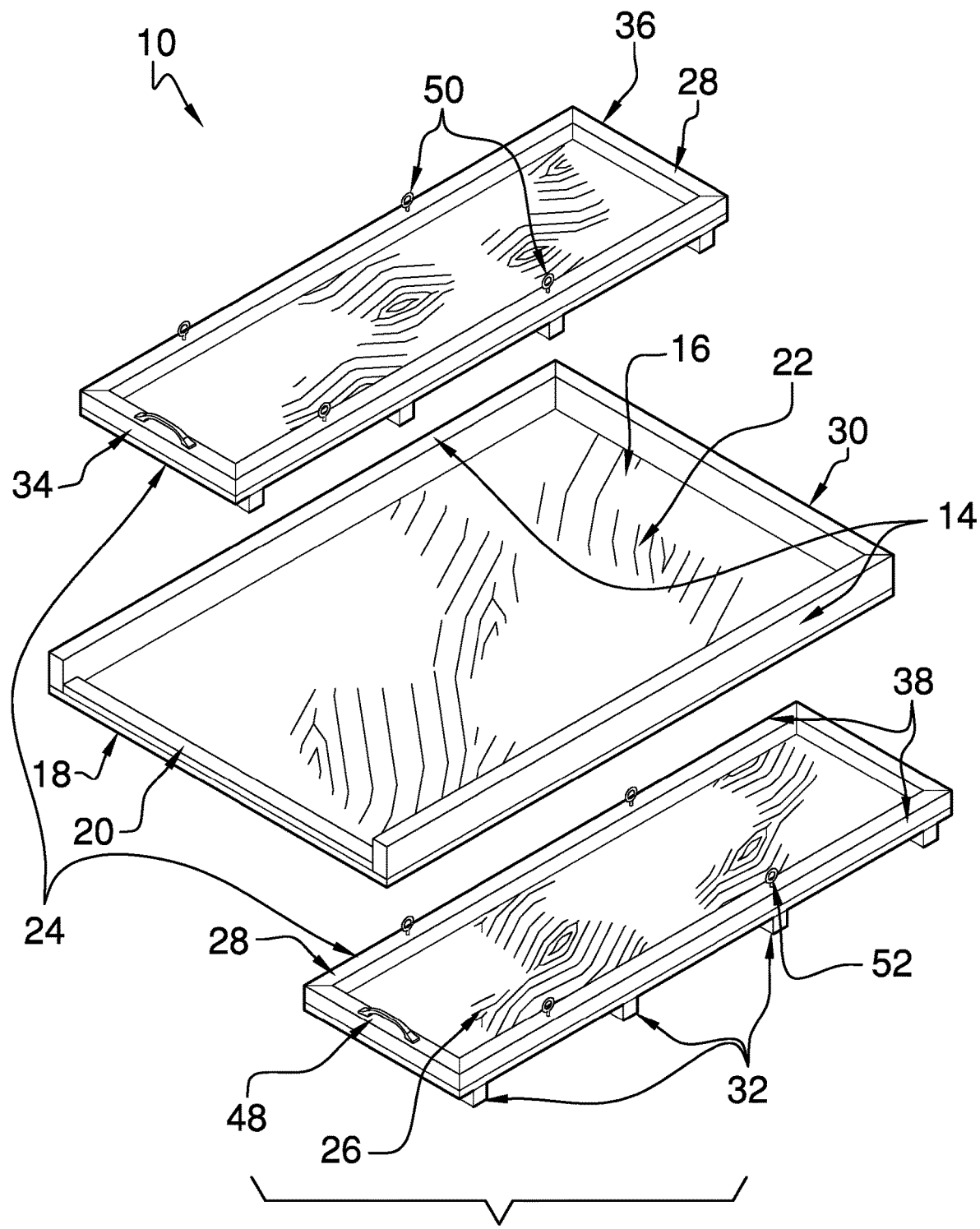
FIG. 1 is an isometric perspective kit view of an extendible truck bed storage assembly according to an embodiment of the disclosure.

With reference now to the drawings, and in particular to FIGS. 1 through 5 thereof, a new storage assembly embodying the principles and concepts of an embodiment of the disclosure and generally designated by the reference numeral 10 will be described.

Figure 2:
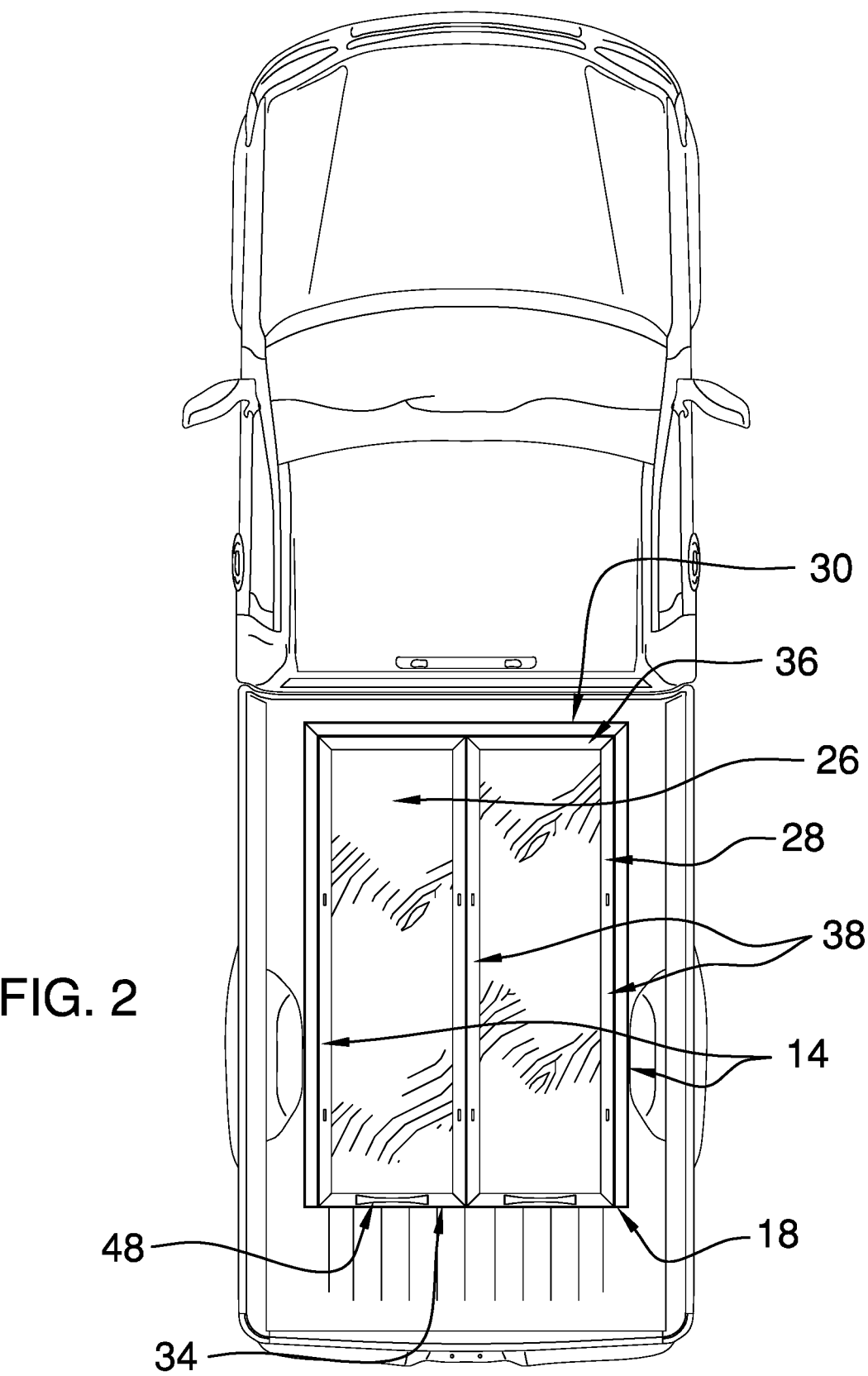
FIG. 2 is an in-use view of an embodiment of the disclosure.

As best illustrated in FIGS. 1 through 5, the extendible truck bed storage assembly 10 generally comprises a box 12, which is sized so that the box 12 is removably insertable into a bed of a truck with each of opposed sides 14 of the box 12 being positioned proximate to respective tire well of the truck, as shown in FIG. 2. The box 12 has a top 16 and a front 18, which are open. A ridge 20 is engaged to a bottom 22 of the box 12 and positioned therein adjacent to the front 18. The ridge 20 extends substantially between the opposed sides 14.

A tray 24 is positioned in the box 12 and is slidably engaged thereto so that the tray 24 is selectively extendible from the box 12 through the front 18. The tray 24 is configured to have articles positioned thereupon. The tray 24 comprises a panel 26, which has a lip 28 extending circumferentially therearound and extending therefrom. The lip 28 is configured to retain the articles positioned upon the tray 24. The panel 26 is rectangularly shaped. The tray 24 may be one of a set of trays 24, with each tray 24 extending from the front 18 to a back 30 of the box 12, and with the set of trays 24 extending between the opposed sides 14 of the box 12. The set of trays 24 may comprise two trays 24, as shown in FIG. 1.

A set of slats 32 is engaged to a lower face 42 of the tray 24 and extends between a forward end 34 and a rearward end 36 thereof. Each slat 32 is perpendicular to opposed edges 38 of the tray 24. The set of slats 32 may comprise a pair of end slats 54 and a pair of medial slats 56. The end slats 54 are positioned singly proximate to the forward end 34 and the rearward end 36. The medial slats 56 are substantially evenly spaced between the end slats 32. The present invention also anticipates the set of slats 32 comprising more than four slats 32.

The forward end 34 of the tray 24 is configured to be grasped in a hand of a user, positioning the user to lift and pull the tray 24 to selectively extend the tray 24 from the box 12 to access the articles. Each slat 32 is positioned to selectively engage the ridge 20 as the tray 24 is slid from the box 12, such that the tray 24 is prevented from sliding until the tray 24 is lifted to elevate the slat 32 over the ridge 20.

Figure 4:
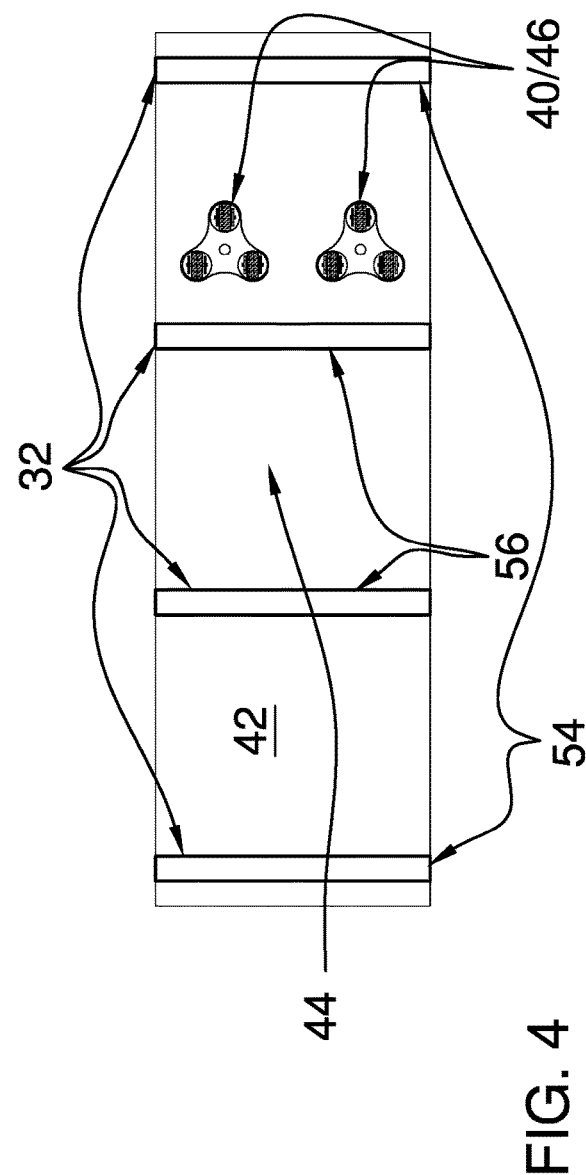
FIG. 4 is a bottom view of an embodiment of the disclosure.

A set of wheels 40 is engaged to the lower face 42 of the tray 24. The wheels 40 are positioned between the rearward end 36 and a midpoint 44 of the tray 24 and are configured to facilitate sliding of the tray 24 relative to the box 12. The set of wheels 40 may comprise a pair of three-wheeled dolly castors 46, as shown in FIG. 4, or other rolling means, such as castors, cylinders, and the like.

A handle 48 is engaged to the forward end 34 of the tray 24. The handle 48 is configured to be grasped in the hand of the user, positioning the user to lift the forward end 34 so that the slat 32 is passable over the ridge 20. The user then is positioned to pull on the handle 48 to selectively extend the tray 24 from the box 12 to access the articles positioned thereupon. The handle 48 may be engaged to the lip 28, as shown in FIG. 1.

Figure 3:
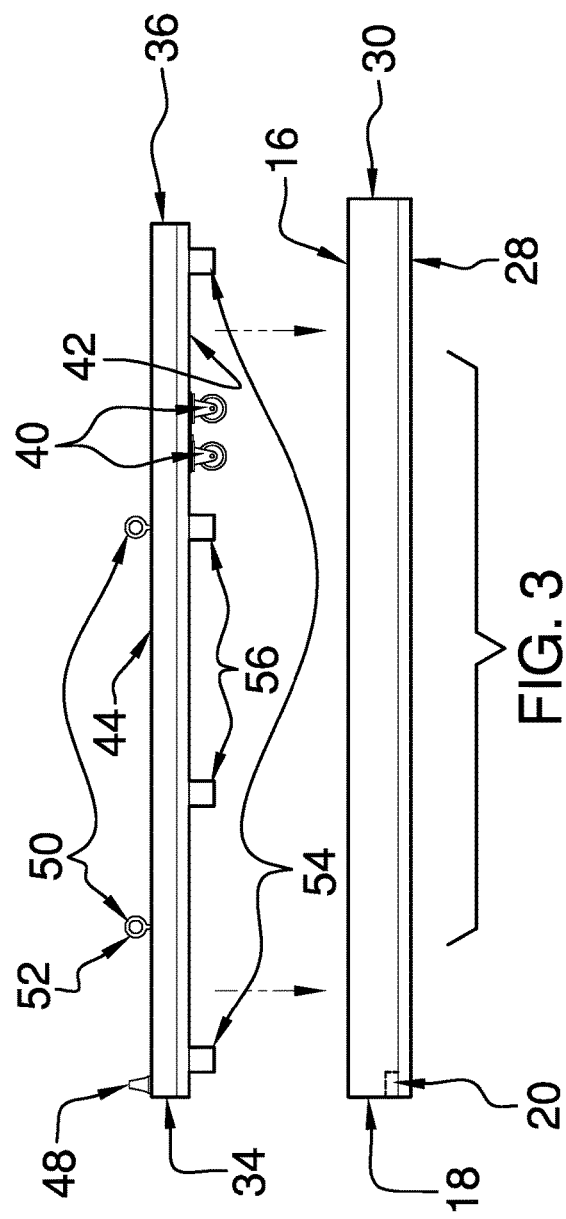
FIG. 3 is a side view of an embodiment of the disclosure.

A set of connectors 50 engaged to the lip 28 is configured to engage a strap (not shown), such as a bungee cord, tie down, and the like, so that the strap extends between opposed edges 38 of the tray 24 and over an article positioned thereupon. The strap secures the article to the tray 24. Each connector 50 may comprise an eyebolt 52, as shown in FIG. 3, or other connecting means, such as, but not limited to, D-rings, hooks, and the like. The set of connectors 50 may comprise two pairs of connectors 50, as shown in FIG. 1. The set of connectors 50 also may comprise three or more pairs of connectors 50.

In use, the box 12 is positioned in the bed of the truck and the trays 24 are inserted thereinto. The trays 24 can be selectively extended from the box 12 to position articles upon and to remove articles from the trays 24. The assembly 10 allows the articles to be loaded and retrieved from a rear of the truck, rather than requiring the user to reach over the sides of the truck bed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. An extendible truck bed storage assembly comprising:
a box sized such that the box is removably insertable into a bed of a truck with each of opposed sides of the box being positioned proximate to respective tire well of the truck, the box having a top and a front, the top and front being open;
a ridge engaged to a bottom of the box and positioned therein, the ridge being adjacent to the front;
a tray positioned in the box and being slidably engaged thereto, such that the tray is selectively extendible from the box through the front, wherein the tray is configured for positioning of articles thereupon; and
a set of slats engaged to a lower face of the tray and extending between a forward end and a rearward end thereof, each slat being perpendicular to opposed edges of the tray, wherein the forward end of the tray is configured for grasping in a hand of a user, positioning the user for lifting and pulling the tray for selectively extending the tray from the box for accessing the articles, such that each slat is positioned for selectively engaging the ridge as the tray is slid from the box, such that the tray is prevented from sliding until the tray is lifted for elevating the slat over the ridge.

2. The extendible truck bed storage assembly of claim 1, wherein the ridge extends between the opposed sides.

3. The extendible truck bed storage assembly of claim 1, wherein the tray comprises a panel having a lip extending circumferentially therearound and extending therefrom, wherein the lip is configured for retaining the articles positioned upon the tray.

4. The extendible truck bed storage assembly of claim 3, wherein the panel is rectangularly shaped.

5. The extendible truck bed storage assembly of claim 4, wherein the tray is one of a set of trays, each tray extending from the front to a back of the box, the set of trays extending between the opposed sides of the box.

6. The extendible truck bed storage assembly of claim 5, wherein the set of trays comprises two trays.

7. The extendible truck bed storage assembly of claim 4, wherein the set of slats comprises a pair of end slats and a pair of medial slats, the end slats being positioned singly proximate to the forward end and the rearward end, the medial slats being evenly spaced between the end slats.

8. The extendible truck bed storage assembly of claim 1, further including a set of wheels engaged to the lower face of the tray and being positioned between the rearward end and a midpoint of the tray, wherein the wheels are configured for facilitating sliding of the tray relative to the box.

9. The extendible truck bed storage assembly of claim 8, wherein the set of wheels comprises a pair of three-wheeled dolly castors.

10. The extendible truck bed storage assembly of claim 1, further including a handle engaged to the forward end of the tray, wherein the handle is configured for grasping in the hand of the user, positioning the user for lifting the forward end such that the slat is passable over the ridge, positioning the user for pulling on the handle for selectively extending the tray from the box for accessing the articles positioned thereupon.

11. The extendible truck bed storage assembly of claim 3, further including a handle engaged to the lip proximate to the forward end of the tray, wherein the handle is configured for grasping in the hand of the user, positioning the user for lifting the forward end such that the slat is passable over the ridge, positioning the user for pulling on the handle for selectively extending the tray from the box for accessing the articles positioned thereupon.

12. The extendible truck bed storage assembly of claim 3, further including a set of connectors engaged to the lip and being configured for engaging a strap, such that the strap extends between opposed edges of the tray and over an article positioned thereupon, for securing the article to the tray.

13. The extendible truck bed storage assembly of claim 12, wherein each connector comprises an eyebolt.

14. The extendible truck bed storage assembly of claim 12, wherein the set of connectors comprises two pairs of connectors.

15. An extendible truck bed storage assembly comprising:
- a box sized such that the box is removably insertable into a bed of a truck with each of opposed sides of the box being positioned proximate to respective tire well of the truck, the box having a top and a front, the top and front being open;
- a ridge engaged to a bottom of the box and positioned therein, the ridge being adjacent to the front, the ridge extending substantially between the opposed sides;
- a tray positioned in the box and being slidably engaged thereto, such that the tray is selectively extendible from the box through the front, wherein the tray is configured for positioning of articles thereupon, the tray comprising a panel having a lip extending circumferentially therearound and extending therefrom, wherein the lip is configured for retaining the articles positioned upon the tray, the panel being rectangularly shaped, the tray being one of a set of trays, each tray extending from the front to a back of the box, the set of trays extending between the opposed sides of the box, the set of trays comprising two trays;
- a set of slats engaged to a lower face of the tray and extending between a forward end and a rearward end thereof, each slat being perpendicular to opposed edges of the tray, wherein the forward end of the tray is configured for grasping in a hand of a user, positioning the user for lifting and pulling the tray for selectively extending the tray from the box for accessing the articles, such that each slat is positioned for selectively engaging the ridge as the tray is slid from the box, such that the tray is prevented from sliding until the tray is lifted for elevating the slat over the ridge, the set of slats comprising a pair of end slats and a pair of medial slats, the end slats being positioned singly proximate to the forward end and the rearward end, the medial slats being substantially evenly spaced between the end slats;
- a set of wheels engaged to the lower face of the tray and being positioned between the rearward end and a midpoint of the tray, wherein the wheels are configured for facilitating sliding of the tray relative to the box, the set of wheels comprising a pair of three-wheeled dolly castors;
- a handle engaged to the forward end of the tray, wherein the handle is configured for grasping in the hand of the user, positioning the user for lifting the forward end such that the slat is passable over the ridge, positioning the user for pulling on the handle for selectively extending the tray from the box for accessing the articles positioned thereupon, the handle being engaged to the lip; and
- a set of connectors engaged to the lip and being configured for engaging a strap, such that the strap extends between opposed edges of the tray and over an article positioned thereupon, for securing the article to the tray, each connector comprising an eyebolt, the set of connectors comprising two pairs of connectors.

* * * * *